Nov. 2, 1954   HIROMU IWAMAE   2,693,004
DEVICE FOR EXTRUDING SYNTHETIC FIBERS
Filed May 8, 1952
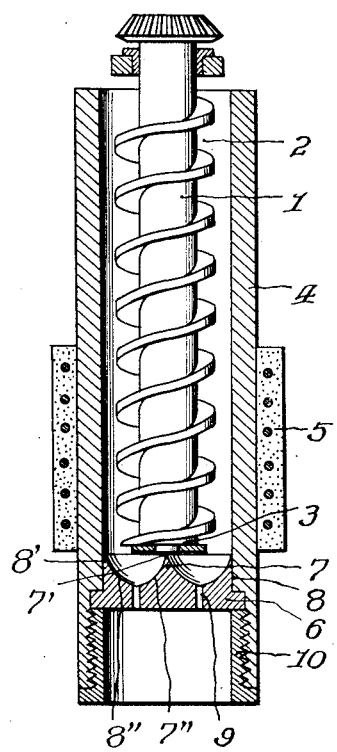
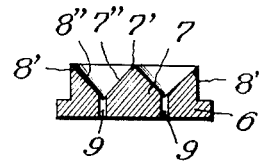
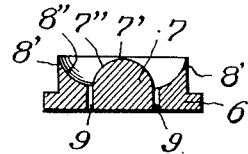
INVENTOR.
HIROMU IWAMAE
BY
ATTORNEY.

United States Patent Office 2,693,004
Patented Nov. 2, 1954

2,693,004

DEVICE FOR EXTRUDING SYNTHETIC FIBER

Hiromu Iwamae, Ukyo-Ku, Kyoto-Shi, Japan

Application May 8, 1952, Serial No. 286,775

4 Claims. (Cl. 18—8)

The present invention relates to a device for extruding synthetic fiber such as vinyl chloride polymer or vinyl chloride-vinylidene chloride co-polymer.

Generally, in the extrusion of any synthetic fiber, it is usual to push the melted raw material out of a nozzle by means of a gear-pump or extruding screw. However, when a melted material such as vinyl chloride polymer of high viscosity or vinyl chloride-vinylidene chloride co-polymer of easily decomposable character is used as the raw material, the gear-pump system can not be used in view of its mechanical character and necessary operating time and an extruding screw system should be used. On the other hand, in the latter system, if any of the melted material lodges between the end surface of the extruding screw shaft and the nozzle-plate, then the melted material at high temperature would immediately tend to undergo decomposition, resulting in an adverse effect upon the character of the product.

In the usual extruding screw system, however, any lodging of melted material occurs on the circumference of the lower end of the screw shaft or on the circumference of the nozzle-plate, resulting in unfavorable spinning operation. Furthermore, if a flat portion exists on the upper surface of the nozzle-plate, then lodging of the product is apt to occur on this flat portion.

The torpedo type extruding screw has been devised in order to avoid the above defects. This device, however, is of complex form in the construction of the guide path of its nozzle hole, because of the conical form of the top end of the extruding screw shaft. Therefore, it is very difficult to build or clean the device. On the other hand, according to my experience, if an extruding screw shaft having a flat end surface is used, then a dead point will occur in the portion apart from the center of the flat end surface during rotation of the extruding screw shaft, resulting in the lodging or deposition of the melted material.

The object of this invention is to provide a device which will permit effective manufacture of products of uniform and excellent character while avoiding the various above mentioned drawbacks, that is, any loading or packing of melted material in the device, and without decomposition of the material being handled or adverse effect upon its uniform character.

Another object of this invention is to provide a device which has a relatively simple construction and which has a nozzle-plate which may be exchanged easily.

According to this invention, these objects are accomplished by a construction wherein the end plate of the extruding screw shaft for extruding the melted material has a flat surface and the nozzle-plate facing this end plate is provided with a center projection having a projecting point facing the center of the end plate of the extruding screw shaft and a circular projecting rim adjacent the circumferential inner surface of the wall of the screw cylinder. The trough formed by the projection and the rim is perforated to provide several extrusion orifices.

The principle and the objects of this invention will be understood more clearly from the following explanation when read in connection with the accompanying drawings, wherein Fig. 1 is a vertical sectional side view of an embodiment of this invention;

Fig. 2 is a vertical sectional view of a modified form of nozzle-plate suitable for use in the device of the invention, and Fig. 3 is a similar view of another form of nozzle-plate.

In Fig. 1, 1 is an extruding screw shaft provided with a spiral guide screw 2 and a flat end plate 3 and positioned in a guide cylinder 4. 5 is a heating device and 6 is a nozzle-plate which is fixed in the cylinder 4 by a screw-nut 10 in such manner that it faces the end plate 3.

Plate 6 is provided with a center projection 7 having a projecting point 7' facing the center of the end plate 3 and a circular projecting rim 8' facing the circumference 8 of the guiding surface of the cylinder 4. 9 are extrusion orifices provided in the trough formed by the slanting surfaces 7'' and 8''.

The operation of the device in Fig. 1 is as follows:

When powdered raw materials are charged from above, they are melted by heat from the heating device 5 and then are extruded out of the nozzle-plate 6 through the orifices 9. The melted material at the central part of the flat surface 3 flows down easily along the slanting surface 7' and the melted material at the circumference of the nozzle-plate flows down along the slanting surface 8'. As a result, the melted material flows down smoothly and rapidly into the orifices 9 without lodging on the surface of the extruding screw, resulting in excellent extrusion.

The nozzle-plate 6 may be modified in form as shown in the embodiments of Figs. 2 and 3, wherein the same reference numerals as are used in Fig. 1 indicate corresponding parts.

The present invention is not restricted to the above mentioned embodiments and may be embodied in other constructions within the scope of the claims.

Having thus described my invention, what I claim is:

1. A device for extruding fibers from an extrudable material which comprises, in combination, an extruding cylinder having an apertured nozzle-plate secured at its discharge end, an extruding screw shaft having a flat end surface opposed to the inner surface of said nozzle-plate for forcing the material through the apertures in the nozzle-plate, said nozzle-plate being formed with a central projection directed toward the center of said end surface of the extruding screw shaft and a circular projecting peripheral rim adjacent the inner circumference of the extruding cylinder, said nozzle-plate being formed with an annular trough between said central projection and said peripheral rim, the perforations in said nozzle-plate being formed in said trough, and the walls of said trough connecting the central projection with the periphery of the peripheral rim being sloped.

2. A device for extruding fibers from an extrudable material as defined in claim 1, wherein the walls of the trough in said nozzle-plate have curved surfaces between said central projection and said peripheral rim.

3. A device for extruding fibers from an extrudable material as defined in claim 1, wherein the sloped walls of said trough are rectilinear.

4. A device for extruding fibers from an extrudable material as defined in claim 1, wherein the nozzle-plate is removably secured to the discharge end of said extruding cylinder.

References Cited in the file of this patent

UNITED STATES PATENTS

| Number | Name | Date |
|---|---|---|
| 2,336,159 | Bent | Dec. 7, 1943 |